United States Patent
Latarnik et al.

(10) Patent No.: US 6,439,045 B1
(45) Date of Patent: Aug. 27, 2002

(54) METHOD FOR USING TIME MEASUREMENTS FOR DETECTING PRESSURE LOSS IN VEHICLE TIRES

(75) Inventors: Michael Latarnik, deceased, late of Friedrichsdorf, by Eva-Maria Latarnik, Christine Latarnik, and Sylvia-Monika Latarnik, heirs; Markus Zenzen, Hattersheim; Martin Griesser, Eschborn, all of (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/424,205

(22) PCT Filed: May 19, 1998

(86) PCT No.: PCT/EP98/02937

§ 371 (c)(1),
(2), (4) Date: Jan. 19, 2001

(87) PCT Pub. No.: WO98/52780

PCT Pub. Date: Nov. 26, 1998

(30) Foreign Application Priority Data

May 23, 1997 (DE) .......................................... 197 21 480

(51) Int. Cl.⁷ .......................... B60C 23/02; B60C 23/00
(52) U.S. Cl. ..................................... 73/146.5; 340/444
(58) Field of Search ................................ 340/442, 443, 340/444, 669, 670, 671; 73/146.5, 146.2, 146.4

(56) References Cited

U.S. PATENT DOCUMENTS

| | | | |
|---|---|---|---|
| 4,876,528 A | | 10/1989 | Walker et al. .............. 340/442 |
| 4,905,783 A | * | 3/1990 | Bober ......................... 180/142 |
| 5,192,929 A | | 3/1993 | Walker et al. .............. 340/444 |
| 5,591,906 A | * | 1/1997 | Okawa et al. ............. 73/145.6 |
| 5,710,539 A | * | 1/1998 | Iida ............................. 340/444 |
| 6,060,984 A | * | 5/2000 | Braun ......................... 340/442 |
| 6,118,369 A | * | 9/2000 | Boesch ....................... 340/443 |

FOREIGN PATENT DOCUMENTS

| | | |
|---|---|---|
| EP | 0 489 563 | 6/1992 |
| EP | 0 512 745 | 11/1992 |
| EP | 0 636 503 | 2/1995 |
| EP | 0 656 268 | 6/1995 |
| WO | 95 12 498 | 5/1995 |

OTHER PUBLICATIONS

Search Report of the German Patent Office for Application No. 197 21 480.0.

* cited by examiner

*Primary Examiner*—William Oen
(74) *Attorney, Agent, or Firm*—Rader, Fishman & Grauer PLLC

(57) ABSTRACT

The present invention relates to a method of detecting pressure loss in vehicle tires, wherein a reference value is produced from signals, especially time measurement values, representative of the wheel rotational speeds of a plurality of vehicle wheels, and pressure loss is concluded from a comparison of a currently determined reference value with at least one comparative value in case the currently determined reference value exceeds or falls below the comparative value, and pressure loss in vehicle tires is detected by using at least one reference value which is produced by dividing the sums of respectively two signals representative of the wheel rotational speeds.

21 Claims, 3 Drawing Sheets

METHOD FOR USING TIME MEASUREMENTS FOR DETECTING PRESSURE LOSS IN VEHICLE TIRES

TECHNICAL FIELD

The present invention relates to a method of detecting pressure loss in vehicle tires.

BACKGROUND OF THE INVENTION

The prior published application No. WO 95/12498 discloses the learning of correction factors with respect to the individual wheels of a vehicle during a first phase which shall compensate for possible differences in the diameters of the individual wheels. In the current operation the established wheel rotational speeds are multiplied with the respective learned correction factors in order to determine the vehicle speed from the wheel rotational speeds. The correction factors shall also be actually determined during driving. When the currently determined correction factor differs from the correction factor established for this wheel in the learning phase by more than a defined threshold value, pressure loss in the vehicle tire is detected. The correction factors are acquired in response to the driving situation so that the effects of possible deviations of wheel rotational speeds are taken into account which are due to longitudinal or transverse acceleration, due to cornering and the possibly related oversteering or understeering of the vehicle, or due to different slip values caused by differing coefficients of friction on the left and right road sides.

Further, it is known from U.S. Pat. Nos. 4,876,528 and 5,192,929 to detect pressure loss in tires of a vehicle by summing up the rotational speeds of the diagonal wheels and by establishing the difference between the sums. When this difference ranges between 0.05% and 0.6% of the mean value of both sums, the rotational speed of each individual wheel is allowed to deviate at most 0.1% from the mean speed of all four wheels. Pressure loss is signalled in the event of a greater deviation. Monitoring of the pressure loss is performed only if the vehicle is travelling straight, at least approximately. In the contrary case, the difference adopts a too great value due to a possibly understeering or oversteering behavior of the vehicle during cornering.

An object of the present invention is to provide a method which permits identifying pressure loss in a tire in a most simple and nevertheless maximum reliable fashion.

SUMMARY OF THE INVENTION

According to the present invention, this object is achieved because pressure loss in vehicle tires is identified by using at least one reference value which is produced by dividing the sums of respectively two signals representative of the wheel rotational speeds.

For example, the reference values can be produced as follows:

$$\text{Ref1} = (T_{vl} + T_{hr})/(T_{vr} + T_{hl})$$

$$\text{Ref2} = (T_{vl} + T_{vr})/(T_{hr} + T_{hl})$$

$$\text{Ref3} = (T_{vl} + T_{hl})/(T_{vr} + T_{hr}).$$

The quantity $T_i$ is the signal representative of the rotational speed of the wheel, and the indices i have the following meaning: vl=front left-hand, vr=front right-hand, hl=rear left-hand, hr=rear right-hand, and refer to the wheel concerned. In a particularly favorable manner, the quantity $T_i$ as the signal representative of the rotational speed of the wheel can be established by the implementation of the method of the invention.

Advantageously, numerical problems in determining the reference values are minimized by the method of the present invention. In the prior art, initially two quantities are summed which have almost the same value. Thus, differences will occur only after a few digits behind the decimal point, from which, however, first problems may arise. In another step, the difference between these two sums is produced in the state of the art. As stated hereinabove, the two sums also adopt rather exactly the same value. In any case, deviations of these two sums inhere already a certain inaccuracy. When, on top of that, these two quantities are differenced, possible inaccuracies will still rise considerably so that the established difference, under certain circumstances, is no longer apt to be utilized as a numerical value.

According to the present invention, the reference values produce the sums of respectively two signals representative of the wheel rotational speeds, and respectively two of these sums are divided. Advantageously, this permits minimizing the numerical problems because the method of the present invention obviates the need for summing two almost equally great quantities and thereafter subtracting the sums in the subsequent steps.

In a preferred embodiment, the signals representative of the rotational speeds of the individual vehicle wheels are produced because the time measurement of the individual wheels, after a joint start signal, is started individually with the respectively following signal edge initiated by the respective wheel and is concluded individually for each wheel upon termination of a full or partial number of wheel revolutions predetermined for all wheels. In systems which make available only the number of the signal edges and the time of the last signal edge per scanning interval, favorably, an interpolation is made with reference to the corresponding signal edge which corresponds to the end of the measuring section.

Further inaccuracies can be avoided compared to the procedure of determining wheel rotational speeds which observes how many signal edges pass by in a predefined time window. In this mentioned procedure, there is an inaccuracy at the beginning and the end of the time window, in which position the sensor wheel is placed with respect to the last signal edge passing. This is because it may be the case that the last signal edge passage has just about taken place, or that the last signal edge passage took place so long ago that the following signal edge passage is imminent. Consequently, matters depend on the position which the sensor wheel adopts in the interspace between two teeth of the sensor wheel opposite the sensor.

The method of the present invention advantageously minimizes this inaccuracy because the position of the sensor wheel with respect to the sensor is exactly fixed at the beginning and the end of the measuring operation. With a sensor wheel having 48 teeth, this means in each case a $\frac{1}{48}$ rotation at the beginning and the end of the measuring operation.

The number of wheel rotations is predetermined as a function of the vehicle speed.

This provision may be effected, for example, so that the number of the wheel rotations varies proportionally with the vehicle speed. It may e.g. be achieved that the measurement time in which the signal representative of the wheel rotational speed shall be established is maintained approximately constant.

The number of the wheel turns can be integral. It is also possible to predefine a number of wheel turns which is not integral. In this case, the measuring operation ends with the edge of a tooth other than the tooth where measurement began. In order to begin the measuring operation exactly with one edge and to have it end exactly with the edge of another tooth, it is necessary to fix that part of the rotations which is no more completed in conformity with the number of the teeth of the sensor wheel.

Further embodiments of this procedure may include that for sensors with scanning intervals (which are so rated that the time information is not gathered for each signal edge but in which sensors scanning intervals are opened and closed with individual signal edges, and the number of the signal edges disposed in the scanning interval and the beginning and end time of the scanning interval is stored) an interpolation with reference to the defined signal edge is effected unless this edge marks the end of a scanning interval. The interpolation may take place under the assumption of a constant speed in the scanning interval, for example.

Measuring can be effected for each individual wheel. A general start signal is issued. After this start signal, the measuring operation is started individually for each wheel when the corresponding edge of the tooth of the sensor wheel has been detected. A defined edge of a tooth may e.g. be detected because a tooth gap is provided at one point of the sensor wheel in order to permit detecting the absolute angular position of the sensor wheel. Starting from this gap, the teeth identified can be included in the count and, thus, detected individually. However, it is also possible to arrange for other procedures of detecting and allocating the single teeth of the sensor wheel.

In a preferred embodiment, at least one comparative value can be predefined by adding an offset to the mean value of the reference value, or subtracting an offset therefrom, when a quality gauge of the scattering of the mean values does not exceed a defined value and/or when the established maximum and minimum values of the reference values differ by not more than a defined value from the mean value of the reference values.

Favorably, the comparative values are set when the established data show that only little variations in the reference values occur. The reference values in an unaccelerated straight travel are equal zero in the ideal case. Thus, a check can be made whether the reference values differ from the value 1 by not more than a defined threshold.

The quality gauge for scattering can be calculated from the filtered and unfiltered values and can be the standard deviation, for example.

Taking the filtered values into consideration individually permits identifying single or several measured values of the rotational speed with a major deviation which, with a comparatively great reliability, are not due to signal noise of the transducer because the noise effects have been filtered by the low-pass filter means. Favorably, the filter is a low-pass filter of first order. Detection of these major deviations eliminates the need to produce a comparative value in case excessive differences prevail with those values from which the comparative value shall be produced. Expediently, the production of a comparative value is suppressed when, caused by driving conditions, the rotational speeds of the wheels have different values as can be the case e.g. during cornering.

Taking into account the unfiltered values (favorably by way of integrating several values in a mean value and determining a quality gauge, e.g., the standard deviation) permits determining to what extent the wheel rotational speeds have changed in the interval during which the measured values were acquired.

In a preferred method, a first set of measured values and a second set of measured values is produced, and comparative values are produced as a function of the maximum value and the minimum value of the reference values when in both sets of measured values the maximum values of the reference values, the minimum values of the reference values and the respective arithmetical mean of the reference values of the two sets differ from each other by not more than respectively predetermined defined amounts and the quality gauge of scattering does not exceed a defined value.

Appropriately, this method is employed when excessively great variations occur continuously which render a setting of the comparative values impossible. The method of the present invention achieves an adaption of the comparative values to the extent of the variations of the reference values. More specifically, the variations of the reference values on an increased level are verified for stability. The comparative values are then determined as a function of the variations.

This permits adapting the accuracy requirements step by step to the manufacturing tolerances and deviations due to the driving conditions. The value of the offset may amount to 0.5 pro mille. The predetermined amount may be in the magnitude of 0.1 pro mille, and the other predetermined amount may also be in the magnitude of 0.1 pro mille. In a preferred aspect, the multiple of the quality gauge can be four times the quality gauge.

When a top and a bottom limit value is fixed in such a fashion, pressure losses are checked by means of these values. The top and bottom limit values are then maintained until these values are reset.

When the determination of the comparative values has not yet been successful in the second set of measured values, this method is repeated, and the corresponding values of the second set of measured values are taken into account for comparison in the next attempt.

In a preferred embodiment, the comparative values are determined axle-responsively.

This proves expedient especially when utilizing the reference value Ref2 alone or in combination. Where the objective is to detect pressure loss on both axles, modifications of the pressure loss bound limits can be permitted for the respective axle at issue. In the wheels of the driven axle, pressure losses cause a smaller deviation of the wheel rotational speed than in the wheels of the non-driven axle. Consequently, the bound limit, starting from which pressure loss is detected, is set to be lower in the wheels of the driven axle than in the wheels of the non-driven axle.

The comparative values are determined as a function of speed wherein, it has proven favorable to establish comparative values as supports, for example, in steps of 30 km/h to 50 km/h. In the routine operation, for example, the comparative value can be used whose speed is closest to the actual speed, or interpolation can be made between two comparative values of the next lower and next higher speed.

In a preferred embodiment, the values found are stored when driving is interrupted and read out again after restart of driving. In this arrangement, it is favorable that also a sneaking pressure loss, with the vehicle at standstill, can be detected immediately upon restart of driving. Further, the information about the air pressure in the vehicle tires is available instantaneously upon restart of driving. The memorized values are at least the comparative values.

A reset key is actuated when a wheel is changed because the air pressure in the tire during wheel change is most probably different compared to the wheel that was previously mounted. It is advantageous that the comparative values are redefined when a wheel change has been carried out.

If necessary, the redefining action can also be effected after check of the air pressure in the tire, which can be detected when the protective cap of the valve is removed.

A manually operable reset key is provided in a preferred embodiment. This also permits the vehicle driver to initiate a new determination of the comparative values when, for example, the air pressure of the tires was checked and correspondingly replenished. Reduction of the expenditure in terms of switches and sensors can be achieved thereby. It is then the duty of the user of the vehicle to ensure an initialization when a tire was changed or air was refilled.

Preferably, the production of the reference values is interrupted when defined threshold values of the longitudinal acceleration, transverse acceleration and/or wheel acceleration are exceeded. A test can be made by way of these quantities as to whether the wheel rotational speed signals show major deviations which are due to driving conditions such as cornering, where at least the rotational speeds of the curve-outward wheels differ from the rotational speeds of the curve-inward wheels. Further, when the vehicle exhibits an oversteering or understeering driving behavior in a bend, related deviations of the rotational speeds of the wheels of the front and rear axles will arise during cornering. It can be derived from the longitudinal acceleration whether deviations of the rotational speeds of the driven wheels from the rotational speeds of the non-driven wheels have to be expected which are due to an acceleration. It can be read from the wheel acceleration whether the vehicle moved through a pothole so that single wheels turn freely, with the result of a deviation of the rotational speed of these wheels. Interruption of the pick-up of measuring data is appropriate in all these cases.

Preferably, the production of the reference values is interrupted as soon as braking intervention is performed. This interrupts the acquisition of the values when the brake slip causes different rotational speeds of the wheels which are due to the braking operation. Braking intervention can be detected, for example, when an ABS system responds or when an active braking intervention is performed in a traction slip system. Likewise, this condition can be concluded from the brake light switch which responds already in braking operations where the amount of wheel slip is considerably smaller.

Thus, the method of the present invention favorably shows that one or a plurality of comparative values are determined only if it can be concluded from the established measured values that this is expedient. Compared to the other prior art method where the comparative value is newly established and, if necessary, rejected in a continuous way, the advantage achieved is that wheel rotational speeds which have already been falsified due to a changed tire pressure will no longer be taken into account in the comparative value. Because the rotational speeds of the wheels which have already suffered from pressure loss are also included in the production of the comparative value in the prior art method, the faulty wheel rotational speed value influences the comparative value whose special purpose is to detect that this wheel is failing. Thus, the comparative value is newly established in a continuous way in the prior art methods so that faulty wheel rotational speeds will automatically lead to a faulty comparative value. The detection of pressure loss is possible only with delay. In contrast thereto, the present method compares reference values with previously established comparative values so that pressure loss can be detected without delay.

An optical and/or audible warning signal may be issued as soon as pressure loss is detected.

DETAILED DESCRIPTION OF THE PREFERRED EMBODIMENTS

Figure 1:
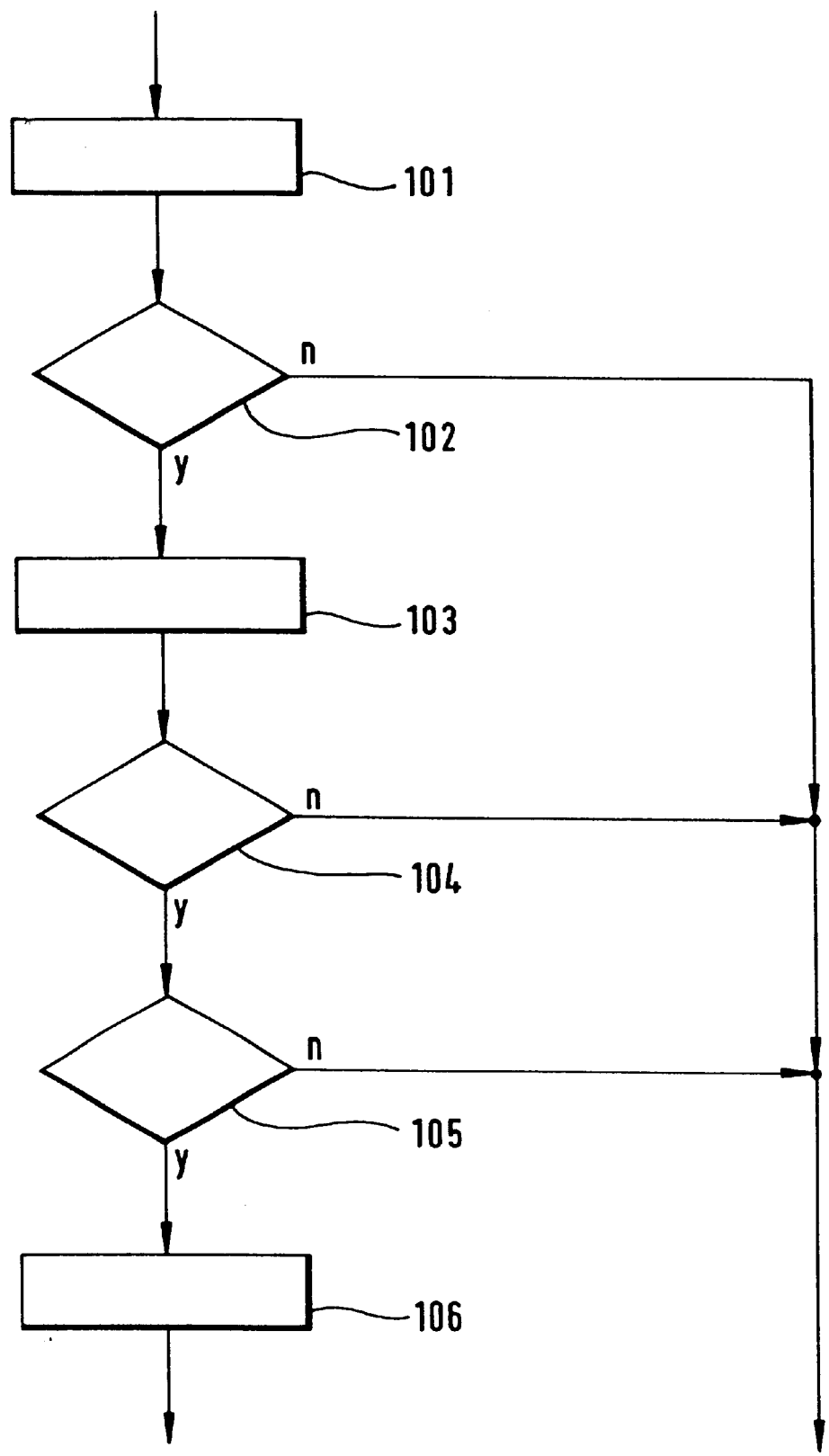
FIG. 1 is a flow chart of a method for establishing the comparative values.

As shown in FIG. 1, initially, the wheel rotational speed signals of the individual wheels are gathered in step 101.

It can then be checked in step 102 whether there is a driving condition which makes it inappropriate to produce the reference values. Such a driving condition may be, for example, that the longitudinal acceleration of the vehicle, the transverse acceleration of the vehicle and/or the wheel acceleration of at least one wheel of the vehicle exceed defined threshold values.

Likewise, such a driving condition can include that braking intervention is effected. This may be detected, for example, by a response of an anti-lock system, a traction slip control with braking intervention and/or an evaluation of the brake light switch. Also, this action can be performed upon detection of system malfunctions such as sensor faults.

When it is detected that such a driving condition prevails, the current cycle of the method is terminated.

In the contrary case, there is a transition to step 103 where at least one reference value Ref1, Ref2, Ref3 is produced from the times measured. The reference values may be produced as follows, for example:

$$Ref1 = (T_{vl} + T_{hr})/(T_{vr} + T_{hl})$$

$$Ref2 = (T_{vl} + T_{vr})/(T_{hr} + T_{hl})$$

$$Ref3 = (T_{vl} + T_{hl})/(T_{vr} + T_{hr}).$$

The quantity T is the signal representative of the rotational speed of the wheel, and the indices have the following meaning: vl=front left-hand, vr=front right-hand, hl=rear left-hand, hr=rear right-hand, and refer to the respective wheel. In the capacity of the signal representative of the rotational speed, advantageously, the period of time can be used which was required for a predetermined number of wheel turns.

One or a plurality of these reference values in combination can be used for the further procedure.

Advantageously, the signal representative of the rotational speed of the wheel is acquired with an improved accuracy by means of a time measurement corresponding to the description in the introductory part of the description. Repeating these parts of the application is refrained from, because the procedure has been described sufficiently clearly by this cross reference.

An unfiltered value is established in each case and a value which underwent low-pass filtering. It is favorable that the filter is a low-pass filter of first order.

Further, it is checked in step 103 whether the currently established filtered reference value is greater than the previously established maximum value of the filtered reference values. If this is the case, the currently established filtered reference value will be memorized as the maximum value of the filtered reference values.

Likewise, it is checked in step 103 whether the currently established filtered reference value is smaller than the previously established minimum value of the filtered reference value. If this is the case, the currently established filtered reference value is memorized as the minimum value of the filtered reference values.

The mean value of the unfiltered reference values and the pertinent quality gauge is determined continuously from the unfiltered reference value in step 103.

Thereafter, there is a transition to step 104 checking whether a defined number of reference values has already been established.

In the negative, the method is terminated for the time being until a number of reference values is established in further cycles of the method which corresponds to the defined number.

When it is found out in step 104 that a defined number of reference values has already been established, there will be a transition to step 105.

Step 105 checks whether the difference between the maximum values and minimum values of the filtered reference values established in step 103 is smaller than a first threshold value. Further, a check is made whether the quality gauge of the unfiltered reference values is inferior to a second threshold value.

When this is not the case, the corresponding values will be deleted (mean value, quality gauge, maximum value and minimum value). In case the deviation was too great, this may have been due to adverse driving conditions (accelerations, cornering). Continued attempts are made to establish reference values which satisfy the corresponding conditions for the determination of a comparative value.

When the check in step 105 was successful, there will be a transition to step 106 where comparative values are established by averaging the reference values and addition or subtraction of an offset.

Figure 2:
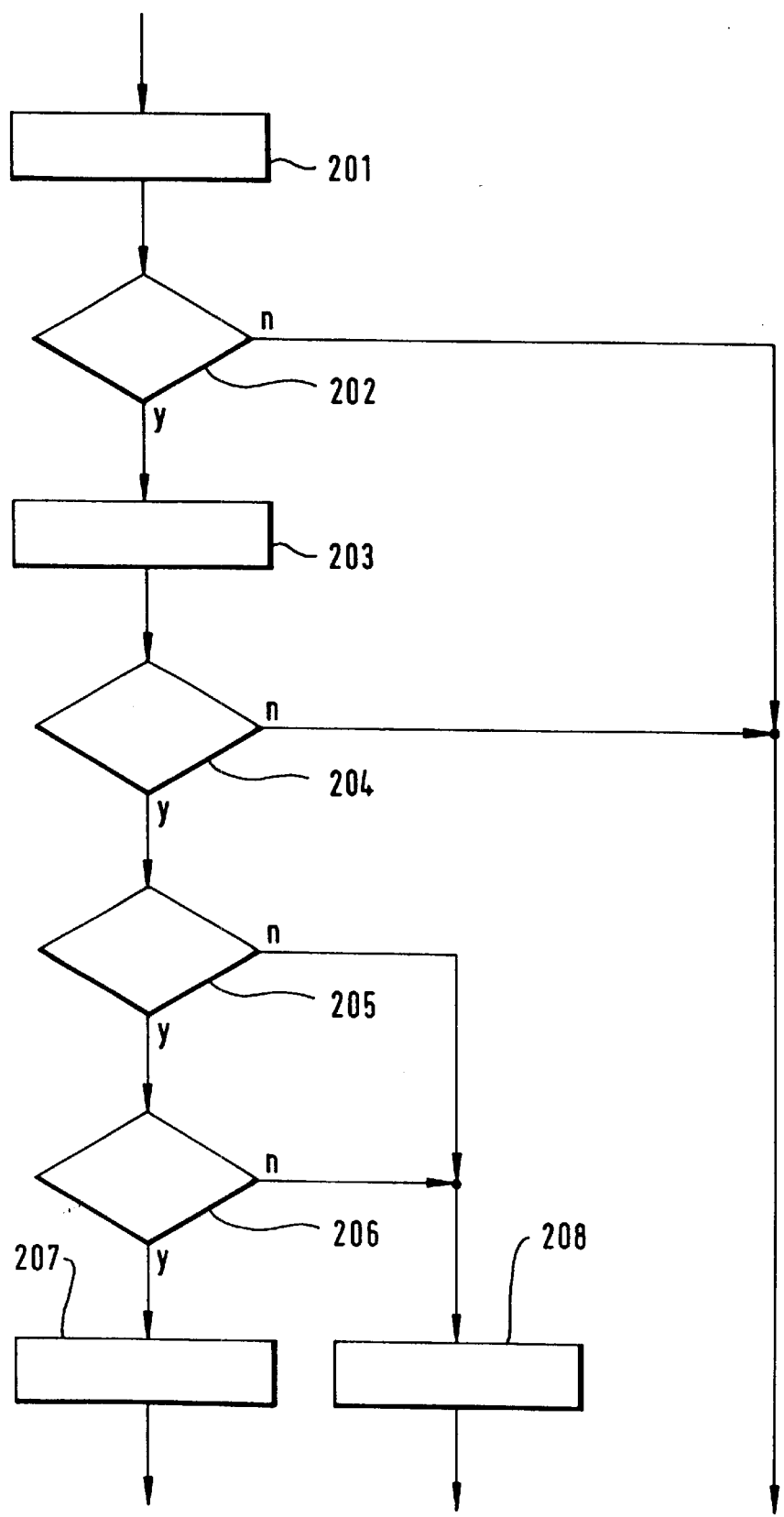
FIG. 2 is a flow chart of a method for establishing the comparative values.

FIG. 2 shows a cycle of a method of establishing the comparative values. The first steps of this method are identical to the steps of FIG. 1.

Initially, the wheel rotational speed signals of the individual wheels are stored in step 201.

It can then be checked in step 202 whether a driving condition prevails which makes it appear inappropriate to produce the reference values. Such a driving condition may e.g. include that the longitudinal acceleration of the vehicle, the transverse acceleration of the vehicle and/or the wheel acceleration of at least one wheel of the vehicle exceed defined threshold values.

Also, such a driving condition may include that braking intervention takes place. This can be detected, for example, by response of an anti-lock system, a traction slip control with braking intervention and/or by an evaluation of the brake light switch.

When it is detected that such a driving condition prevails, the current method cycle is terminated.

In the contrary case, there is a transition to step 203 where at least one reference value Ref1, Ref2, Ref3 is produced from the rotational speeds measured. The reference values may be produced as follows, for example:

$Ref1 = (T_{vl} + T_{hr})/(T_{vr} + T_{hl})$ $Ref2 = (T_{vl} + T_{vr})/(T_{hr} + T_{hl})$ $Ref3 = (T_{vl} + T_{hl})/(T_{vr} + T_{hr})$.

The quantity T is the signal representative of the rotational speed of the wheel, and the indices have the following meaning: vl=front left-hand, vr=front right-hand, hl=rear left-hand, hr=rear right-hand, and refer to the respective wheel.

One or a plurality of these reference values in combination can be used for the further procedure.

Advantageously, the signal representative of the rotational speed of the wheel is acquired with an improved accuracy by means of a time measurement corresponding to the invention.

An unfiltered value and a value which underwent low-pass filtering is established in each case. It is favorable that the filter is a low-pass filter of first order.

Further, it is checked in step 203 whether the currently established filtered reference value is greater than the previously established maximum value of the filtered reference values. If this is the case, the currently established filtered reference value will be memorized as the maximum value of the filtered reference values.

Also, it is checked in step 203 whether the currently established filtered reference value is smaller than the previously established minimum value of the filtered reference values. If this is the case, the currently established filtered reference value will be memorized as the minimum value of the filtered reference values.

The mean value of the unfiltered reference values and the pertinent quality gauge is determined continuously from the unfiltered reference value in step 203.

Thereafter, there is a transition to step 204 checking whether another predefined number of reference values has already been established, i.e., whether a complete sample of reference values was stored.

In the negative, the current cycle of the method is terminated.

In the positive, there is a transition to step 205 checking whether the maximum value of the filtered reference values of the currently stored sample differs by not more than a predetermined amount from the maximum value of the filtered reference values of the sample which was memorized the last. Further, it is checked in step 205 whether the minimum value of the filtered reference values of the currently stored sample differs by not more than a predetermined amount from the minimum value of the filtered reference values of the sample which was memorized the last.

If this is the case, there is a transition to step 206. It is checked in step 206 whether the mean value of the unfiltered reference values of the current sample differs by not more than a defined amount from the mean value of the unfiltered reference values of the sample which was memorized the last. Further, it is checked in step 206 whether the mean value of the unfiltered reference values of the current sample plus and minus a multiple of the quality gauge lies within the bound limits given by the top limit value and the bottom limit value. This multiple may be four times the amount, for example.

When this check is also completed successfully, a top limit value is set in step 207 by adding an offset value to the maximum value of the filtered reference values of the current sample. A bottom limit value is set by subtracting an offset value from the minimum value of the filtered reference values of the current sample.

It will be checked in future pressure loss tests whether the reference value lies between the bottom limit value and the top limit value which represent the comparative values.

When the result of one of the checks in step 205 or 206 was that the deviations of the values in the current sample are excessive, there will be a transition to step 208 where the corresponding values of the current sample (mean value, quality gauge of the unfiltered reference values, maximum value and minimum value of the filtered reference values of the current sample) are memorized for comparison with samples that will be stored in the future.

The method illustrated in FIG. 2 is favorably employed in operations where the method of FIG. 1 is not successful. The method according to FIG. 2 will then check whether the deviations of the reference values which prevent a determination of comparative values according to the method of FIG. 1 are stable inasmuch as a determination of comparative values according to the method of FIG. 2 may take place.

Figure 3:
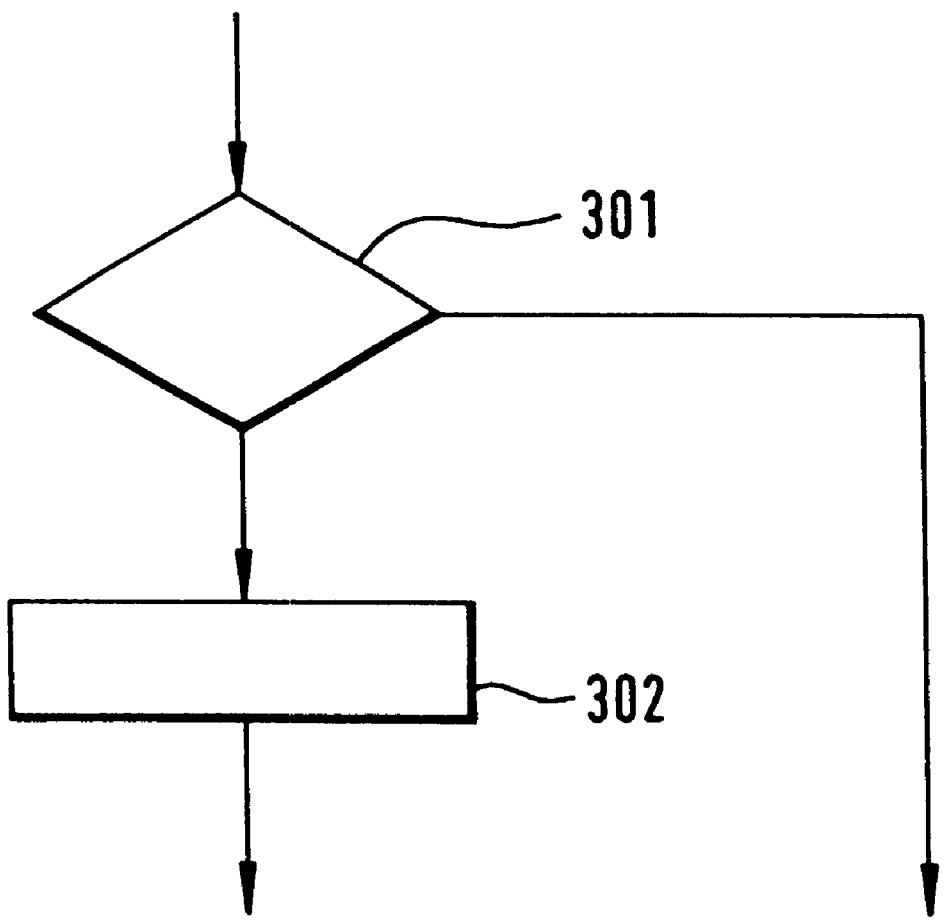
FIG. 3 is a view of the resetting of the established values.

FIG. 3 shows the operation checking the resetting of the corresponding values which should be made, for example, after a wheel is changed or air is replenished. This operation can be monitored by way of appropriate switches of sensors. It is also possible to provide a manually operable reset key.

When the result of the check in step 301 shows that a reset is required, there will be a transition to step 302 where the reset is performed. All memorized values (top and bottom limit value, comparative value, quality gauge, maximum value and minimum value) are set to zero.

What is claimed is:

1. Method of detecting pressure loss in tires of a vehicle with wheels, comprising the steps of:
    measuring rotational speeds of each wheel;
    determining a plurality of reference values representative of the rotational speeds of the wheels as a function of time;
    determining a statistical value of the plurality of reference values;
    determining a comparative value from the statistical value of the plurality of reference values;
    comparing the reference value and the comparative value; and
    applying an offset to the statistical value, wherein when a deviation of the statistical value does not exceed a defined value, wherein the offset is applied when pressure loss occurs when a currently determined reference value is not equal to the comparative value.

2. The method of detecting pressure loss according to claim 1, wherein the function of time is further defined by the steps of:
    using a signal representative of the wheel rotational speeds to define a time measurement for a predetermined number of wheel revolutions;
    issuing a joint start signal of the time measurement for each individual wheel, wherein the time measurement of each wheel is further defined when the following edge of the signal representative of the rotational speed of the respective wheel is detected;
    initiating a scanning interval for the time measurement period for each signal edge so that a scanning sensor opens and closes with individual signal edges;
    defining an interpolation with reference to the corresponding signal edge defined by the time measurement; and
    concluding the joint start signal individually for each wheel upon termination of the number of wheel revolutions predetermined for all wheels.

3. The method of detecting pressure loss according to claim 1, wherein the determining a plurality of reference values step further includes the step of:
    establishing at least one filtered reference value,
    establishing at least one unfiltered reference value, and
    determining a maximum and minimum reference value from the filtered reference values.

4. The method of detecting pressure loss according to claim 3, wherein the determining a statistical value is the mean value of the unfiltered reference values.

5. The method of detecting pressure loss according to claim 3, wherein the determining a statistical value is the average value of the unfiltered reference values.

6. The method of detecting pressure loss according to claim 4, wherein the maximum value is set by adding the offset to the maximum value.

7. The method of detecting pressure loss according to claim 6, wherein the minimum value is set by subtracting the offset from the minimum value.

8. The method of detecting pressure loss according to claim 7 further including the step of:
    checking the currently determined reference value against the minimum and maximum values.

9. The method of detecting pressure loss according to claim 5, wherein the determining a predefined comparative value step includes the addition of the offset to the average of the plurality of reference values.

10. The method of detecting pressure loss according to claim 5, wherein the determining a predefined comparative value step includes the subtraction of the offset to the average of the plurality of reference values.

11. The method of detecting pressure loss according to claim 1, wherein the determining a plurality of reference values is carried out by dividing the sums of two signals representative of the wheel rotational speeds.

12. The method of detecting pressure loss according to claim 1, wherein the offset is generally 0.5 pro mille.

13. The method of detecting pressure loss according to claim 1, wherein the number of wheel revolutions is predetermined as a function of the vehicle speed.

14. Method as claimed in claim 1, wherein the comparative value is determined in dependence on axles.

15. The method of detecting pressure loss according to claim 1, wherein the comparative value is determined speed-responsively.

16. The method of detecting pressure loss according to claim 1, further including the step of actuating a reset key when a wheel is changed.

17. The method of detecting pressure loss according to claim 1, further including the step of providing a manually operable reset key.

18. The method of detecting pressure loss according to claim 1, further including the step of interrupting the production of the reference values when defined threshold values of the longitudinal acceleration, transverse acceleration and/or wheel acceleration are exceeded.

19. Method of detecting pressure loss in tires of a vehicle with wheels, comprising the steps of:
    measuring rotational speeds of each wheel;
    determining a plurality of reference values representative of the rotational speeds of the wheels as a function of time, wherein the determining a plurality of reference values step further comprises the steps of:
    establishing at least one filtered reference value,
    establishing at least one unfiltered reference value,
    determining a maximum and minimum reference value from the filtered reference values, and
    checking the currently determined reference value against the minimum and maximum values;
    determining a mean value of the unfiltered reference values;
    determining a comparative value from the mean value of the unfiltered reference values;

comparing the reference value and the comparative value; and applying an offset to the mean value, wherein when a deviation of the statistical value does not exceed a defined value, wherein the offset is applied when pressure loss occurs when a currently determined reference value is not equal to the comparative value, wherein the maximum value is set by adding the offset to the maximum value, wherein the minimum value is set by subtracting the offset from the minimum value.

20. The method of detecting pressure loss according to claim 19, wherein the function of time is further defined by the steps of:

using a signal representative of the wheel rotational speeds to define a time measurement for a predetermined number of wheel revolutions;

issuing a joint start signal of the time measurement for each individual wheel, wherein the time measurement of each wheel is further defined when the following edge of the signal representative of the rotational speed of the respective wheel is detected;

initiating a scanning interval for the time measurement period for each signal edge so that a scanning sensor opens and closes with individual signal edges;

defining an interpolation with reference to the corresponding signal edge defined by the time measurement; and concluding the joint start signal individually for each wheel upon termination of the number of wheel revolutions predetermined for all wheels.

21. Method of detecting pressure loss in tires of a vehicle with wheels, wherein the number of wheel revolutions is predetermined as a function of the vehicle speed, comprising the steps of:

measuring rotational speeds of each wheel;

determining a plurality of reference values representative of the rotational speeds of the wheels as a function of time, wherein the determining a plurality of reference values is carried out by dividing the sums of two signals representative of the wheel rotational speeds, wherein the determining a plurality of reference values step further comprises the steps of:
establishing at least one filtered reference value,
establishing at least one unfiltered reference value,
determining a maximum and minimum reference value from the filtered reference values, and
checking the currently determined reference value against the minimum and maximum values, wherein the function of time is further defined by the steps of:

using a signal representative of the wheel rotational speeds to define a time measurement for a predetermined number of wheel revolutions, issuing a joint start signal of the time measurement for each individual wheel, wherein the time measurement of each wheel is further defined when the following edge of the signal representative of the rotational speed of the respective wheel is detected, initiating a scanning interval for the time measurement period for each signal edge so that a scanning sensor opens and closes with individual signal edges, defining an interpolation with reference to the corresponding signal edge defined by the time measurement, and concluding the joint start signal individually for each wheel upon termination of the number of wheel revolutions predetermined for all wheels;

interrupting the production of the reference values when defined threshold values of the longitudinal acceleration, transverse acceleration and/or wheel acceleration are exceeded;

determining a mean value of the plurality of unfiltered reference values;

determining a comparative value from the statistical value of the plurality of reference values, wherein the comparative value is determined in dependence on axles, wherein the comparative value is determined speed-responsively;

comparing the reference value and the comparative value; and applying an offset to the statistical value, wherein the offset is generally 0.5 pro mille, wherein when a deviation of the statistical value does not exceed a defined value, wherein the offset is applied when pressure loss occurs when a currently determined reference value is not equal to the comparative value, wherein the maximum value is set by adding the offset to the maximum value, wherein the minimum value is set by subtracting the offset from the minimum value, wherein the determining a predefined comparative value step includes the addition of the offset to the average of the plurality of reference values, wherein the determining a predefined comparative value step includes the subtraction of the offset to the average of the plurality of reference values.

* * * * *